United States Patent [19]

Naeini et al.

[11] Patent Number: 5,351,290
[45] Date of Patent: Sep. 27, 1994

[54] TELECOMMUNICATIONS FRAUD PREVENTION SYSTEM AND METHOD

[75] Inventors: Abdolreza S. Naeini, Dallas; Lindsey D. Owen, Carrollton; Harold E. A. Hansen, Plano, all of Tex.

[73] Assignee: Intellicall, Inc., Carrollton, Tex.

[21] Appl. No.: 944,166

[22] Filed: Sep. 11, 1992

[51] Int. Cl.$^5$ .................. H04M 17/00; H04M 15/00; H04M 3/00
[52] U.S. Cl. .................................. 379/145; 379/127; 379/189
[58] Field of Search ............... 379/143, 145, 188, 189, 379/199, 200, 112, 127, 142

[56] References Cited

U.S. PATENT DOCUMENTS

| | | | |
|---|---|---|---|
| 3,813,495 | 5/1974 | Conerly | 179/7 MM |
| 3,829,617 | 8/1974 | Caithamer et al. | 179/7.1 R |
| 4,054,756 | 10/1977 | Comella et al. | 179/18 B |
| 4,122,308 | 10/1978 | Weinberger et al. | 179/7.1 R |
| 4,326,123 | 4/1982 | Hosterman | 235/380 |
| 4,439,636 | 3/1984 | Newkirk et al. | 179/7.1 R |
| 4,538,030 | 8/1985 | Fossett et al. | 179/7.1 TP |
| 4,585,904 | 4/1986 | Mincone et al. | 179/7.1 TP |
| 4,593,157 | 6/1986 | Usdan | 179/90 BD |
| 4,595,983 | 6/1986 | Gehalo et al. | 364/401 |
| 4,712,230 | 12/1987 | Rice et al. | 379/112 |
| 4,731,818 | 3/1988 | Clark, Jr. et al. | 379/144 |
| 4,736,405 | 4/1988 | Akiyama | 379/89 |
| 4,746,786 | 5/1988 | Heberle et al. | 235/380 |
| 4,763,350 | 8/1988 | Immendorfer et al. | 379/67 |
| 4,766,604 | 8/1988 | Axberg | 379/67 |
| 4,768,223 | 8/1988 | Kinoshita et al. | 379/143 |
| 4,769,834 | 9/1988 | Billinger et al. | 379/112 |
| 4,777,647 | 10/1988 | Smith et al. | 379/151 |
| 4,791,640 | 12/1988 | Sand | 370/58 |
| 4,797,910 | 1/1989 | Daudelin | 379/67 |
| 4,825,460 | 4/1989 | Carter et al. | 379/67 |
| 4,890,317 | 12/1989 | Hird et al. | 379/132 |
| 4,897,875 | 1/1990 | Pollard et al. | 379/189 X |
| 4,908,852 | 3/1990 | Hird et al. | 379/130 |
| 4,920,558 | 4/1990 | Hird et al. | 379/67 |
| 4,920,562 | 4/1990 | Hird et al. | 379/132 |
| 4,933,965 | 6/1990 | Hird et al. | 379/112 |
| 4,933,966 | 6/1990 | Hird et al. | 379/132 |
| 4,935,956 | 6/1990 | Hellwarth et al. | 379/112 |
| 4,993,062 | 2/1991 | Dula et al. | 379/189 X |
| 5,093,858 | 3/1992 | Hird et al. | 379/132 |
| 5,113,433 | 5/1992 | Hird et al. | 379/130 |
| 5,131,027 | 7/1992 | Hird et al. | 379/112 |
| 5,153,907 | 10/1992 | Pugh et al. | 379/143 |
| 5,218,631 | 6/1993 | Katz | 379/189 X |

FOREIGN PATENT DOCUMENTS

| | | |
|---|---|---|
| 0185-365A1 | 6/1986 | European Pat. Off. . |
| 2600850 | 6/1986 | France . |
| 63-033054 | 12/1988 | Japan . |
| 2134749 | 8/1984 | United Kingdom . |

OTHER PUBLICATIONS

OSSGR, Issue 1, Revision 3, Mar. 1988, Technical Reference No. TR-TSY-000271, "FSD 85-01-0100 Calling Card Service".

OSSGR, Issue 1, Revision 3, Mar. 1988, Technical Reference No. TR-TSY-000271, "FSD 85-01-0200 Collect Billing".

Exhibits A-N, Various Documents relating to Microdevices, Inc.

Primary Examiner—James L. Dwyer
Assistant Examiner—Harry S. Hong
Attorney, Agent, or Firm—Baker & Botts

[57] ABSTRACT

A fraud prevention system and method are provided which utilize communication between an intelligent network platform 14 and a local telecommunications device 10. The local telecommunications device 10 comprises a memory 20 which stores various data values. Intelligent network platform 14 comprises a memory 22 which stores a copy of the values in memory 20. The intelligent network platform 14 randomly generates an address which is transmitted to the local telecommunications device 10. The local telecommunications device 10 retrieves data located at the address and transmits the data to the intelligent network platform 14 as an access string prior to the placement of telephone calls using the intelligent network platform 14. The time and day of the telephone call may also be included in the access string to prevent signals recorded at one time from being used to place telephone calls at another time.

2 Claims, 2 Drawing Sheets

5,351,290

TELECOMMUNICATIONS FRAUD PREVENTION SYSTEM AND METHOD

TECHNICAL FIELD OF THE INVENTION

This invention relates in general to the field of electronic systems and more particularly to an improved telecommunications fraud protection system and method.

BACKGROUND OF THE INVENTION

Modern telecommunications systems use a variety of codes and access protocols to communicate between local telecommunications devices such as smart payphones and central offices or common carriers. These codes can be recorded by tapping into the phone line between the local device and the central office. Fraud can then be practiced on the telecommunications system by outpulsing the recorded codes to place unauthorized telephone calls. In this manner, thieves can place calls using stolen credit card numbers or other access codes.

Fraud is especially a problem in international calls where even relatively short calls can still be extremely expensive. Accordingly, a need has arisen for a system and method of preventing the use of fraudulently recorded billing account numbers, credit card numbers and other access codes in a telecommunication system.

SUMMARY OF THE INVENTION

In accordance with the teachings of the present invention, a telecommunications fraud prevention system and method are provided which substantially reduces disadvantages associated with prior systems.

According to one embodiment of the present invention, a method for processing a telephone call from a local telecommunications device through a telecommunications network comprising a network peripheral system is provided that comprises the steps of:
  receiving a destination telephone number from a patron of the local telecommunications device;
  establishing a communication path between the local telecommunications device and the network peripheral system through the telecommunications network;
  generating an index value in the network peripheral system;
  transmitting the index value to the local telecommunications device through the communication path;
  accessing first data stored in the local telecommunications device using the index value received from the network peripheral system;
  transmitting the first data from the local telecommunications device to the network peripheral system using the communication path;
  accessing second data stored in the network peripheral system using the index value;
  comparing the first and second data in the network peripheral system; and
  placing the telephone call using the destination number responsive to said step of comparing, a valid comparison indicating an authorized use by the local telecommunications device of the network peripheral system.

BRIEF DESCRIPTION OF THE DRAWINGS

A more complete understanding of the present invention may be acquired by referring to the Detailed Description of the Invention when considered in conjunction with the accompanying drawings in which like reference numbers indicate like features and wherein.

DETAILED DESCRIPTION OF THE INVENTION

Figure 1:
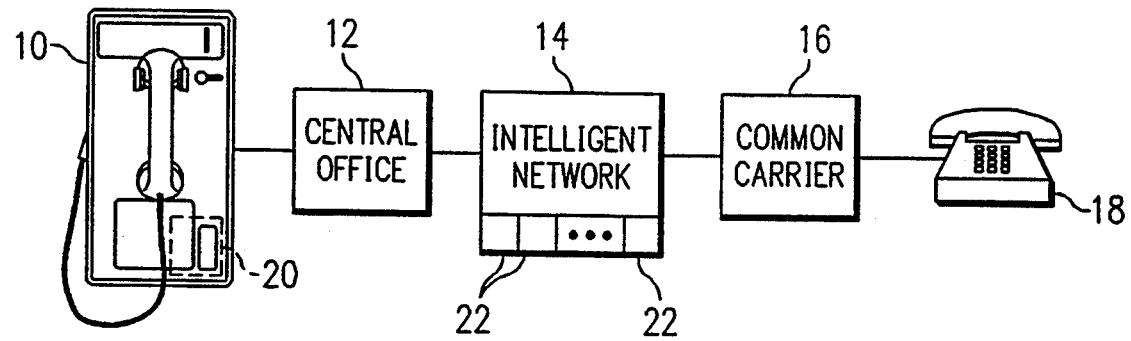
FIG. 1 is a block diagram of a telecommunications system incorporating the fraud prevention system and method of the present invention.

Referring to FIG. 1, a local telecommunications device 10 is shown connected to a local central office 12. Local telecommunications device 10 may comprise, for example, an intelligent pay telephone incorporating automated operator services and autodialing capabilities. Such an intelligent pay telephone may comprise, for example, pay telephones manufactured by Intellicall, Inc. incorporating the Intelli*Star ™ technology which is fully described in U.S. Pat. Nos. 4,933,965; 4,933,966; 4,890,317; 4,908,852; 4,920,588; and 4,920,562, the descriptions of which are hereby incorporated by reference.

The central office 12 is connected to an intelligent network platform 14 through conventional telephone lines, trunks, or out of band communication SS7 links. The intelligent network platform 14 is coupled through a common carrier network 16 to a destination telephone station 18. Common carrier network 16 may comprise any of the publicly available long distance or local telephone services, such as Sprint, AT&T, or MCI.

During conventional operation, a thief may record the signals output by telephone 10 to the central office 12 during the placement of a long distance telephone call. The thief may then play back the recorded signals at a later time to place a fraudulent long distance telephone call.

In accordance with the teachings of the present invention, the intelligence contained within local telecommunications device 10 is used to communicate through the central office 12 to the intelligent network platform 14 to implement a fraud prevention protocol. The fraud prevention protocol is configured such that the dialing codes required to access the intelligent network platform 14 and place telephone calls are constantly changing. In this manner, fraudulently recorded codes cannot access the intelligent network platform 14 at a later time.

In accordance with another aspect of the present invention, local telecommunications device 10 comprises a memory 20 which functions to store a plurality of coded numbers. Memory 20 may comprise, for example, an electrically programmable read-only memory (EPROM). Similarly, intelligent network platform 14 may comprise a plurality of memories 22. After receiving the identity of a particular local telecommunications device 10, the intelligent network platform 14 may access one of the memories 22 which contains the same information as the memory 20 resident within local device 10. According to the teachings of the present invention, the intelligent network platform 14 can then randomly generate an address within the address range of the memory and use that randomly-generated address to access the selected memory 22. The intelligent network platform 14 then transmits using conventional DTMF signal transmission the randomly generated address to the local device 10 which similarly uses the randomly generated addressed to access the code stored at that address within memory 20. The local telecommunications device 10 then transmits the retrieved data to the intelligent network platform 14 which attempts to match the transmitted data with the data retrieved from memory 22 using the same randomly generated address. The local telecommunications device 10 must present the correct code before the intelligent network platform 14 will allow any calls to be placed from the device 10 to the destination telephone 18. In this manner, a thief attempting to illegally charge telephone calls cannot use prerecorded signals as any prerecorded signals will not contain the appropriate code associated with any new random address in a subsequent communication between telecommunications device 10 and intelligent network platform 14.

Figure 2:
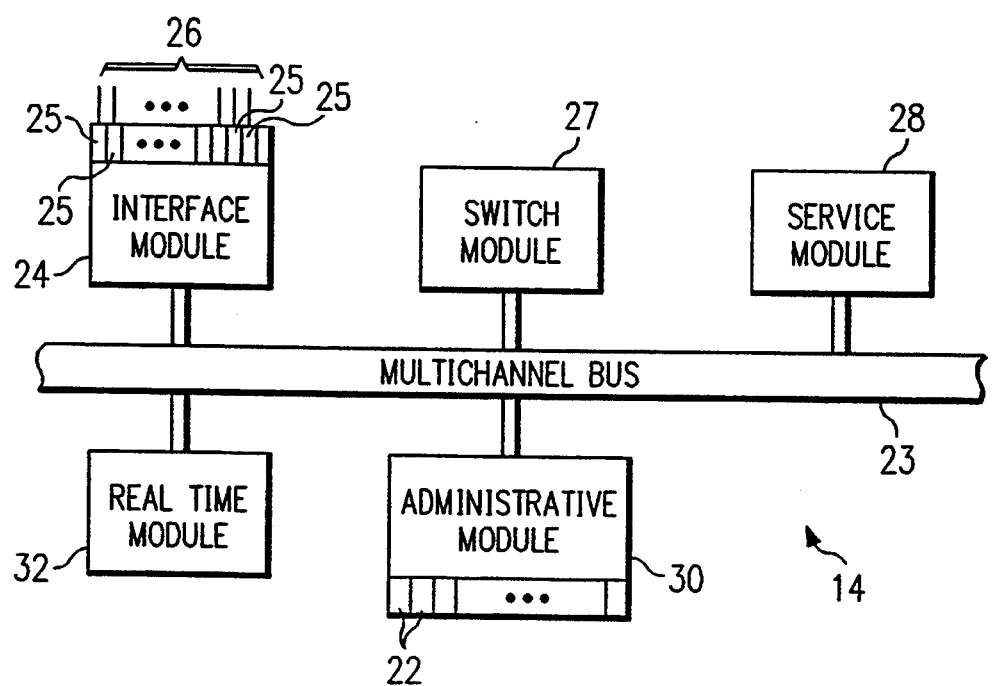
FIG. 2 is a block diagram of an intelligent network platform which may be used to implement the fraud prevention system and method of the present invention.

FIG. 2 is a schematic illustration showing details of one possible embodiment of intelligent network platform 14 constructed according to the teachings of the present invention. FIG. 2 illustrates a modular construction comprising a plurality of independent modules connected using a multi-channel bus 23. Multi-channel bus 23 may comprise a variety of communication media. For example, multi-channel bus 23 may comprise a conventional PCM highway that is time multiplexed for telephone call and control signal traffic. Further, multi-channel bus 23 may comprise standard two conductor local area network links in order to communicate control signals between modules of intelligent network platform 14 through conventional message passing methods and systems. According to one embodiment of the present invention, multi-channel bus 23 may comprise a conventional RS 232 serial communication link.

As described previously, intelligent network platform 14 comprises a plurality of independent modules coupled together through multi-channel bus 23. The first of these modules is an interface module 24. Interface module 24 comprises a plurality of interface systems 25, each respectively coupled to a line 26. Interface systems 25 may comprise conventional telephone line interface modules, trunk line interface modules, or SS7 link interface modules, depending upon the nature of a particular line 26 coupled to each of the respective interface systems 25. Interface systems 25 provide signal buffering and function to channel signals from the lines 26 through the multi-channel bus 23 to a switch module 27.

Switch module 27 may comprise a conventional digital crosspoint switch which may be of a size from 8×8 to on the order of 512×512 or larger depending upon the lines 26 being serviced by the intelligent network platform 14. Switch module 27 serves to couple incoming lines to outgoing trunks or lines. Further, switch module 27 operates to couple incoming lines and outgoing lines to various resources resident in a service module 28 also coupled to multi-channel bus 23.

Service module 28 comprises a variety of resources necessary for the placement of telephone calls and the performance of automated operator services. For example, service module 28 may provide DTMF and MF generation and detection circuitry, speech message recording and playback circuitry and speech memory to store digitized speech prompts and messages. Service module 28 may also comprise circuitry for performing answer detection using signals travelling over telephone lines 26. Service module 28 may further comprise systems to provide voice recognition functionality or other complex functionalities shared by the remainder of intelligent network platform 14.

An important technical advantage of the architecture illustrated in FIG. 2 is that the modularity of the architecture used in intelligent network platform 14 provides expandability of the capabilities of intelligent network platform 14. For example, additional interface modules 24 may be added by connecting these modules to the multi-channel bus 23 to allow for service of more lines 26. The additional interface modules can then utilize the functionalities contained within switch module 27 and service module 28. Accordingly, the modularity of the architecture illustrated in FIG. 2 allows for a high degree of flexibility in meeting the problems of a particular telecommunications environment through the careful balancing of resources embodied in independent modules coupled via the multi-channel bus 23.

Intelligent network platform 14 further comprises an administrative module 30 coupled to multi-channel bus 23. Administrative module 30 functions to control the operation of intelligent network platform 14 and may comprise a conventional 386 or 486 compatible personal computer comprising central processing systems, display systems, input systems, and large scale and short term memory systems. Administrative module 30 may comprise the memories 22 used in the fraud prevention protocol described previously. Administrative module 30 allows for user interaction with intelligent network platform 14 to perform system monitoring, system service and system upgrades. Further, administrative module 30 functions to perform the real time administration of telephone traffic through the intelligent network platform 14. For example, the switch module 27 operates under the control of the administrative module 30 to connect particular lines 26 to outgoing telephone lines or to connect particular resources in service module 28 to telephone calls requiring that resource. It should be understood that administrative module 30 also benefits from the modular nature of the architecture illustrated in FIG. 2. For example, a particular implementation of an intelligent network platform 14 may utilize several special purpose administrative modules controlled by a single master administrative module. Special purpose administrative modules might function as file servers to administer large databases of information which may be used, for example, for validation of billing account numbers used in placement and billing of, for example, credit card phone calls.

According to one embodiment of the present invention, the database management system may comprise a validation interface computer system constructed by Intellicall, Inc. and fully described in U.S. Pat. Nos. 4,933,965; 4,933,966; 4,890,317; 4,908,852; 4,920,588; and 4,920,562, the disclosures of which are hereby incorporated by reference. In operation, administrative module 30 functions to access databases to validate credit card numbers, telephone numbers, and other billing account numbers used in the placement of billable telecommunications traffic.

Further, in very large systems, single administrative modules may be dedicated to the administration of other modules. For example, a single administrative module 30 may be dedicated to the administration of a service module 28 in order to optimize the use of the resources provided by service module 28. Further, a single administrative module 30 may be dedicated to the administration of a predetermined plurality of interface modules 24. These dedicated administrative modules could then be administered by a single administrative module 30. In this manner, the modular architecture illustrated in FIG. 2 easily allows for expansion and optimization of system resources for particular telecommunications environments.

Intelligent network platform 14 also comprises a real time module 32 coupled to the remainder of intelligent network platform 14 through the multi-channel bus 23. Real time module 32 is used to offload the real time work of call processing from the administrative module 30 to eliminate the cost of repetition of the unneeded resources within administrative module 30. For example, a plurality of real time modules 32 may be controlled by a single administrative module 30. In this manner, the user interaction system such as the keyboards and displays are shared between a plurality of real time modules 32. The real time modules 32 comprise the necessary circuitry for the administration and control of the remaining modules of intelligent network platform 14 necessary to complete and administer call traffic but do not comprise the systems uploaded to the master administrative module controlling the plurality of real time module 32. Real time module 32 may contain memories 22 for use in the fraud prevention protocol described previously. In this embodiment, an administrative module controlling real time module 32 contains the necessary systems for user interaction for the purpose of system administration, service and upgrades.

According to one embodiment of the present invention, the interface module 24, switch module 27 and service module 28 may comprise a modular switching peripheral (MSP) manufactured by Redcom Laboratories, Inc. The Redcom MSP comprises a stackable digital telecommunications switching system which enjoys the capabilities detailed previously for the interface module 24, switch module 27 and service module 28. According to this embodiment, the Redcom MSP communicates to an administrative module 30 through a conventional RS 232C serial data communications channel embodying multi-channel bus 23. Further, according to this embodiment, administrative module 30 comprises a conventional 386 or 486 compatible personal computer which controls the resources, line interfaces and switching functionality detailed previously.

Multi-channel bus 23 allows for the remote location of administrative module 30 from the remaining modules. Administrative module 30 may utilize long distance communication channels to administer or reconfigure the operation of the remainder of intelligent network platform 14. For example, administrative module 30 can remotely provide new speech messages for use by service module 28. Further, administrative module 30 may remotely poll the remainder of intelligent network platform 14 to recover stored records of telephone calls placed using the intelligent network platform 14. These records may comprise billable account numbers for telephone calls as well as dates and times of calls, destination numbers, rates for calls, and the duration of calls. This information may be used for later billing of patrons using the telecommunications system incorporating intelligent network platform 14. These billing records can be remotely retrieved by administrative module 30 or administrative module 30 can act during the real time placement of telephone calls to generate these billing records even though administrative module 30 may be located remotely from the remainder of the system.

Figure 3:
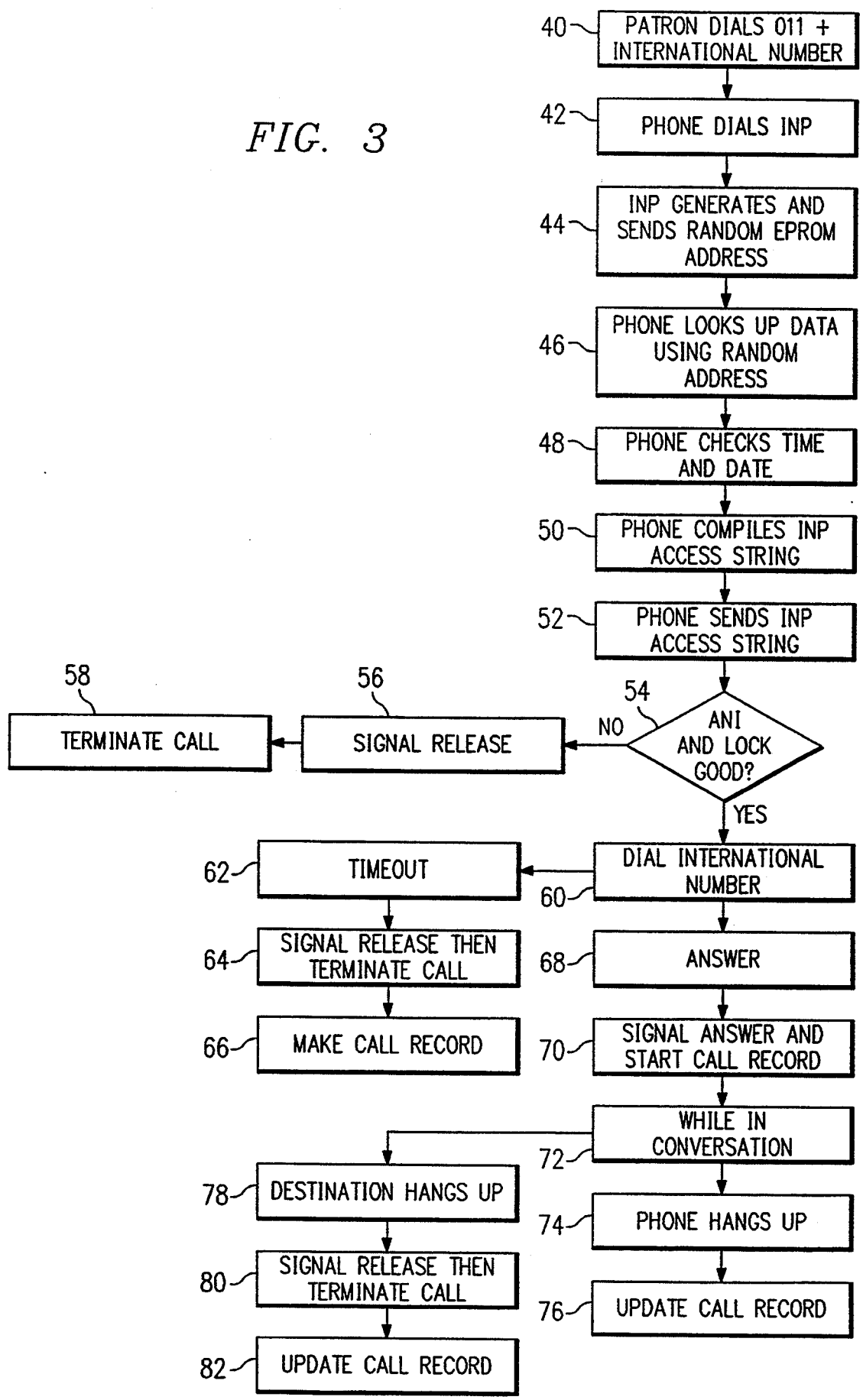
FIG. 3 is a flow chart representation of one embodiment of the fraud prevention method of the present invention.

FIG. 3 is a flow chart that illustrates one embodiment of the fraud prevention method of the present invention, which is used in communication between the intelligent network platform 14 and a local telecommunications device 10. The method of the present invention begins at step 40 where a patron of telecommunications device 10 dials "0-1" or "0-1-1" and an international number. It should be understood that the method of the present invention will be described with reference to an international call due to the particular applicability of the present invention to the potential liability resulting from the large costs of international calls. However, it should be understood that the fraud prevention method of the present invention is applicable to any billable call placed using a local device 10 and an intelligent network platform 14.

The method proceeds to step 42 where the telephone 10 dials the intelligent network platform 14 and waits a predetermined period of time, for example, on the order of thirty seconds for the intelligent network platform 14 to answer. If the intelligent network platform 14 does not answer during the predetermined period of time, the telephone will terminate communication and inform the patron to try his call again later or route the call to a live operator. The method then proceeds in step 44 when the intelligent network platform 14 generates and transmits a random EPROM address to the telecommunications device 10. The method proceeds in step 46 where the phone uses the randomly-generated EPROM address to look up the data within memory 20 resident at that address. The intelligent network platform 14 stores a copy of the data stored in memory 20 and can thus check whether the telecommunications device 10 is in fact an authorized telephone. The method proceeds to step 48 where the phone checks the current time and date. The time and date are included within the access string to further prevent a thief from recording signals at one time and using them at the other. The required access string of a particular phone thus depends on both a randomly-selected data string and the time and day of the call. Accordingly, signals fraudulently recorded at one time will not work to place a call at another time.

The method proceeds to step 50 where the phone compiles the INP access string using the data retrieved from the random address and the time and day of the telephone call. Additionally, the access string may utilize set encryption values which may be added or subtracted from telephone numbers or dates and times to prevent thieves from recognizing these values merely from the inherent recognizable format of certain data such as times, dates, and phone numbers. The access string may also include the phone numbers ANI which may be similarly encoded.

According to one embodiment of the present invention, the INP access communication between the telephone 10 and the intelligent network platform 14 proceeds as follows:

INP → payphone:
$E_5E_4E_3E_2E_1$
Payphone → INP:
$P_2P_1K_{10}K_9K_8K_7K_6K_5K_4K_3K_2K_1$ (2 second pause)
$A_{10}A_9A_8A_7A_6A_5A_4A_3A_2A_1$ (2 second pause)
$D_{16}D_{15}D_{14}D_{13}D_{12}D_{11}D_{10}D_9D_8D_7D_6D_5D_4D_3D_2D_1$ (2 second pause)
$L_{10}L_9L_8L_7L_6L_5L_4L_3L_2L_1$ -continued where, $E$ = eprom offset = 00000–12287;
$P$ = protocol version: 06,
where the protocol version specifies a particular
known encryption value or magic number, given as follows:
magic number = $m_{10}m_9m_8m_7m_6m_5m_4m_3m_2m_1$;
$K$ = key field =
$t_{10}t_9t_8t_7t_6t_5t_4t_3t_2t_1 + m_{10}m_9m_8m_7m_6m_5m_4m_3m_2m_1$
where $t$ = date and time of call given as follows:
$mmddhhmmss$ (month, day, hour, minutes, seconds)
and $m$ = protocol magic number;
$A$ = encoded $ANI$ = $a_{10}a_9a_8a_7a_6a_5a_4a_3a_2a_1 + t_{10}t_9t_8t_7t_6t_5t_4t_3t_2t_1$
where $a$ = payphone's $ANI$;
$D$ = encoded destination number =
$d_{16}d_{15}d_{14}d_{13}d_{12}d_{11}d_{10}d_9d_8d_7d_6d_5d_4d_3d_2d_1 +$
$t_6t_5t_4t_3t_2t_1t_{10}t_9t_8t_7t_6t_5t_4t_3t_2t_1$
where $d$ is 011+ international destination number
with most significant digit zero fill (for example,
if the destination number is 0115283654321, then $d$
is 0000115283654321); and
$L$ = encoded lock = $v_2v_1c_5c_4c_3c_2c_1000 + t_{10}t_9t_8t_7t_6t_5t_4t_3t_2t_1$
where $v$ is an eprom version number
and $c$ = contents of the indicated eprom at an
offset of $E$ = 00000–65535

All addition and subtraction is done on a digit by digit basis with carries and borrows ignored. This removes the need for BCD arithmetic or an ASCII math package.

The method proceeds to step 52 where the phone sends the intelligent network platform access string to the intelligent network platform 14. The method then proceeds to step 54 where the intelligent network platform 14 makes a decision as to whether or not the access string is valid. In order to accomplish this, the intelligent network platform 14 performs the same calculations detailed with respect to the local telephone previously in compiling the intelligent network platform access string. The results of these calculations are then compared to the intelligent network platform access string compiled by the local telephone 10 and if the comparison indicates that the local telephone 10 has not sent a valid access string, the method proceeds to step 56. At step 56, the intelligent network platform 14 releases the signal to the local telecommunication device 10 and the method proceeds to step 58 where the local telecommunication device 10 informs the patron that his call cannot be placed at this time and the call is terminated. If the intelligent network platform access string is determined to indicate a valid access by the local telephone 10 at step 54, the method proceeds to step 60 where the intelligent network platform 14 dials the destination telephone number received from the patron. If no answer is received after a predetermined time, the method times out in step 62 of the method and proceeds to step 64 where the intelligent network platform 14 signals release to the local telephone 10 and terminates the call. The method then proceeds to step 66 where the intelligent network platform 14 constructs a call record comprising information associated with the attempted placement of the telephone call which may comprise, for example, the date and time of the telephone call, the destination number, the rate for the call and any billing account number input by the user.

The intelligent network platform 14 is capable of performing answer detection by examining the signals on the telecommunication path established with the destination telephone 18. If the intelligent network platform 14 detects an answer at step 68 in FIG. 3, the method proceeds to step 70 where the intelligent network platform 14 signals that an answer has been detected and begins timing the duration of the telephone call. The method branches at step 72. If during the conversation the local telecommunications device 10 hangs up at step 74, the method proceeds to step 76 where the timing of the telephone call is terminated and the call record associated with the telephone call is generated. As described previously, this call record may comprise, for example, the destination telephone number, the date and time of the call, a chargeable amount of time for the call, a chargeable amount of money for the call, a billing account number to be billed for the call, or a rate to be charged for the call.

If the destination telephone 18 hangs up during the conversation and the intelligent network platform 14 detects the termination of the call in this manner at step 78, the method proceeds to step 80 where the intelligent network platform 14 signals the local telephone 10 that the call is terminated and terminates the communication path between the intelligent network platform 14 and the destination telephone 18. The method then proceeds to step 82 where a call record associated with the call is generated as discussed previously.

According to another aspect of the present invention, the local telecommunications device and the intelligent network platform communicate during the pendency of a telephone call to provide security during the telephone call. This activity prevents one particular type of fraud from being perpetrated. A fraudulent user of the telecommunications system can begin a telephone call and allow the telephone to set up the call with the INP. The perpetrator can then hang up the telephone but maintain a connection on the telephone line using a portable telecommunications set. In this manner, the initial fraud prevention algorithm is bypassed and the pendency of the call is not billable. The perpetrator is merely billed for the short period of time at the beginning of the call prior to the telephone being hung up.

In order to prevent this fraud, a "keep alive" message is periodically transmitted from the telecommunications device to the intelligent network platform to indicate that a secure call is continuing. According to one embodiment of the present invention, the EPROM within the telecommunications device and the memory within the INP provide an initial string of DTMF signals for the first "keep alive" message. The earpiece of the local telecommunications device is disabled and several DTMF digits are transmitted from the telecommunications device to the intelligent network platform where they are recognized and compared to see if the appropriate "keep alive" message has been sent. During the pendency of the telephone call, subsequent "keep alive" messages must be sent by the local telecommunications device to the intelligent network platform in order for the telephone call to proceed. The subsequent messages can use information from the EEPROM and memory together with information from the previous "keep alive" message. These two sources of information can then be encoded using any suitable encryption algorithm to allow for a time-sensitive and memory-sensitive "keep alive" message that cannot be copied or fraudulently produced. In this manner, the fraud prevention system of the present invention not only prevents fraud at the initiation of the telephone call but continues to check the security of the link between local telecommunications device and the intelligent network platform during the pendency of telephone calls.

Accordingly, a fraud prevention method and system are provided that prevents thieves from fraudulently placing telephone calls on a telecommunications system incorporating the methods and systems of the present invention. The method of the present invention utilizes an access string which incorporates the time and day of the call to prevent codes from being recognized. Further, the intelligent network platform and the telephone each comprise copies of data structures which may be accessed using randomly generated addresses. The data at a particularly random address is also utilized in the access string to once again vary the access string from one call to the next. Encryption of the values in the access string is accomplished by adding or subtracting preselected constants to prevent would-be thieves from recognizing data from portions of the access string by the general organization and nature of values within the string.

While the present invention has been described in detail, it should be understood that various changes, substitutions and alterations may be made to the systems and methods described herein without departing from the spirit and scope of the present invention, which is solely defined by the appended claims.

What is claimed is:

1. A system for processing a telephone call from a local telecommunications device through a telecommunications network comprising a network peripheral system, the system comprising:

circuitry associated with the local telecommunications device for receiving a destination telephone number from a patron of the local telecommunications device;

circuitry for establishing a communication path between the local telecommunications device and the network peripheral system through the telecommunications network;

circuitry associated with the network peripheral system for generating a random address value;

circuitry for transmitting said address value to the local telecommunications device through said communication path;

circuitry for accessing first data stored in the local telecommunications device using said address value received from the network peripheral system;

circuitry for transmitting said first data from the local telecommunications device to the network peripheral system using said communication path;

circuitry for accessing second data stored in the network peripheral system using said address value;

circuitry for comparing said first and second data in the network peripheral system;

circuitry for placing the telephone call using said destination number responsive to said circuitry for comparing, a valid comparison by said circuitry for comparing indicating an authorized use by the local telecommunications device of the network peripheral system;

circuitry associated with the local telecommunications device for transmitting the time the call is placed to the network peripheral system through said communications path; and circuitry associated with the network peripheral system for comparing the time received from the local telecommunications devices to the actual time of the call, said circuitry for placing the telephone call additionally responsive to said circuitry for comparing the time prior to placement of the call such that signals transmitted between a local telecommunications device and a network peripheral system recorded at one time may not be used to place calls using the network peripheral system at a later time.

2. A method for processing a telephone call from a local telecommunications device through a telecommunications network comprising a network peripheral system, the method comprising the steps of:

receiving a destination telephone number from a patron of the local telecommunications device;

establishing a communication path between the local telecommunications device and the network peripheral system through the telecommunications network;

generating a random address value in the network peripheral system;

transmitting the address value to the local telecommunications device through the communication path;

accessing first data stored in the local telecommunications device using the address value received from the network peripheral system;

transmitting the first data from the local telecommunications device to the network peripheral system using the communication path;

accessing second data stored in the network peripheral system using the address value;

comparing the first and second data in the network peripheral system;

placing the telephone call using the destination number responsive to said step of comparing, a valid comparison indicating an authorized use by the local telecommunications device of the network peripheral system;

transmitting the time the call is placed from the local telecommunications device to the network peripheral system through said communications path; and comparing the time received from the local telecommunications devices to the actual time of the call, said step of placing the telephone call additionally responsive to said step of comparing the time prior to placement of the call such that signals transmitted between a local telecommunications device and a network peripheral system recorded at one time may not be used to place calls through the network peripheral system at a later time.

* * * * *